P. C. SOUTHWICK.
CORN SHELLER.
APPLICATION FILED SEPT. 16, 1910.
998,417.
Patented July 18, 1911.
2 SHEETS—SHEET 1.
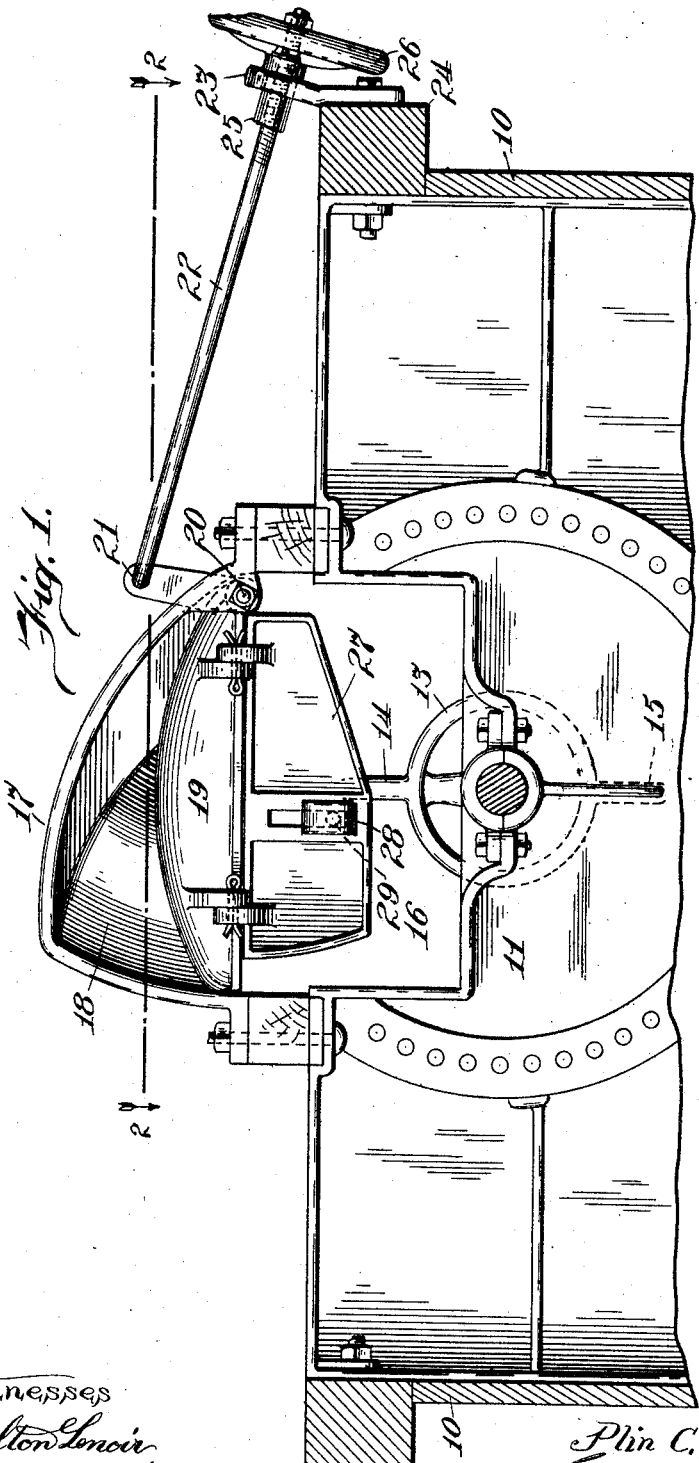
Witnesses
Milton Lenoir
E. M. Klatcher
Inventor
Plin C. Southwick
By Gilsson & Gilsson
Attorneys.

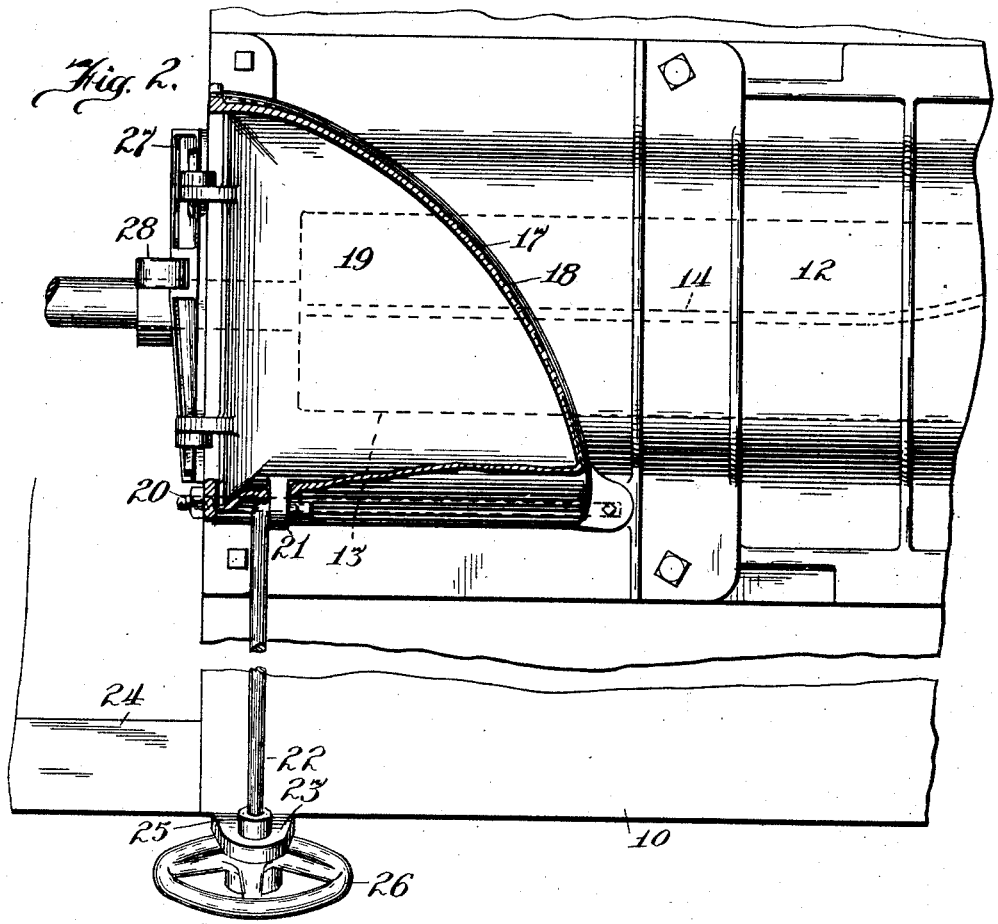
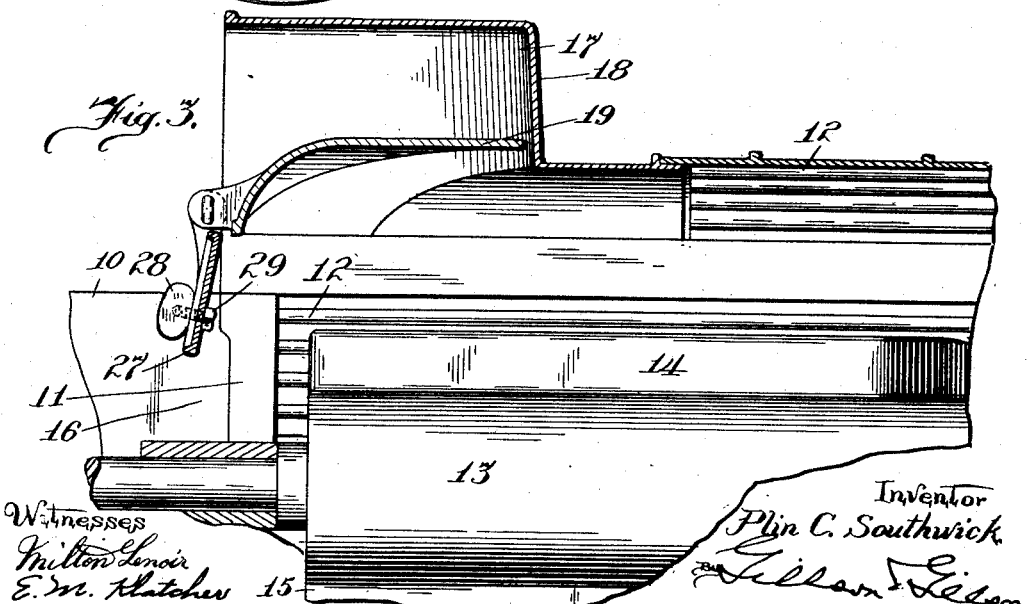

UNITED STATES PATENT OFFICE.

PLIN C. SOUTHWICK, OF SANDWICH, ILLINOIS.

CORN-SHELLER.

998,417.  Specification of Letters Patent.  Patented July 18, 1911.

Application filed September 16, 1910. Serial No. 582,375.

*To all whom it may concern:*

Be it known that I, PLIN C. SOUTHWICK, a citizen of the United States, and resident of Sandwich, county of Dakalb, and State of Illinois, have invented certain new and useful Improvements in Corn-Shellers, of which the following is a specification, and which are illustrated in the accompanying drawings, forming a part thereof.

The invention relates to that type of corn shellers in which the shelling operation is performed within a barrel or cylinder having slotted walls to permit the escape of the grain, the beating and conveying agent being a mandrel having longitudinal fins which are, at least in part, spiral.

The object of the invention is to provide an improved control for the cobs as they are discharged from the cylinder, the invention consisting in the structure hereinafter described and as illustrated in the accompanying drawings, in which—

Figure 1 is a transverse section through the body of the sheller, showing an end view of the cylinder; Fig. 2 is a detail plan section on the line 2—2 of Fig. 1; and Fig. 3 is a detail vertical longitudinal section through the shelling cylinder.

The body of the sheller is represented at 10, 10.

The discharge end of the cylinder is shown at 11, and the cylinder barrel is represented at 12, and is shown as being formed of bars, set in the ends, only one of which is shown.

The mandrel of the shelling beater is designated 13, and its fins at 14, 15. These fins are given a spiral form through at least a portion of their length, for the purpose of advancing the material through the cylinder.

The cob-discharge aperture is shown at 16. The receptacle for the cobs as they are discharged from the cylinder is not shown, as it does not form a part of the present invention.

The volume of material which may pass through a machine of this character depends upon its condition. When the corn shells easily a larger volume may be operated upon in a given time than when it is more difficult to free the grain from the cob. If the discharge aperture is made sufficiently large to permit the free egress of a large volume of cobs which may be discharged when the corn shells freely, it is necessary to provide means for restricting the discharge when the grain is less easily separated from the cob, otherwise the shelling operation is imperfectly performed and much of the grain will be lost.

In order to adapt the machine for operating properly upon the material under these different conditions, there is here provided a commodious discharge aperture 16, with means for regulating its effective size, and such means are measurably automatic. For this purpose the cylinder is provided adjacent its discharge end with an upward extension 17, preferably of metal, the rear wall 18 of this extension being oblique and inclined forwardly in the direction of rotation of the beater, and its upper wall being inclined upwardly in the same direction. Within this extension there is housed a plate 19, pivoted, as shown at 20, adjacent the lower edge of the upper wall of the extension, and provided with an arm 21 extending upwardly through a suitable slot in such wall.

To the upper end of the arm 21 there is pivotally attached a controlling rod 22, which extends through the eye of a bracket 23, fixed to one of the side beams 24 of the sheller body. The outer end of the rod 22 is threaded for engagement of a nut 25, having a hand wheel 26. The nut is prolonged to extend through the eye of the bracket 23, and is shouldered to engage the outer face thereof. By turning up the nut the rod 22 is drawn out, swinging the plate 19 upwardly on its pivot. The nut being free to slide in the bracket eye, the plate 19 may be raised by internal pressure against its lower face, but its downward movement is limited by the engagement of the shoulder of the nut with the bracket.

To the forward edge of the plate 19 there is hinged a plate or damper 27, which depends partially across the aperture 16 and carries a weight 28, secured by means of a screw-bolt 29 setting through a vertical slot in the plate, whereby the weight may be vertically adjusted in order to vary its effectiveness. The plate 19 is preferably curved downwardly toward its forward end to guide the cobs.

When freely shelling corn is being operated upon the plate 19 is raised, as is also the weight 28, permitting free egress of the cobs. When the corn shells less freely one or both are lowered, thereby cramping the discharge of the cobs and retaining them until all the grain is loosened from them.

Choking is automatically prevented by the free upward movement of the plate and outward movement of the gate under internal pressure.

I claim as my invention—

1. In a corn sheller, in combination, a shelling cylinder, a rotatable mandrel for moving material therethrough, an adjustable wall for the cob-discharge aperture of the cylinder, such wall being pivoted on a line parallel with the axis of the cylinder and extending from its pivot in the direction of rotation of the mandrel, and a swinging gate carried by the adjustable wall.

2. In a corn sheller, in combination, a shelling cylinder having an upward extension at its discharge end, means for moving material through the cylinder, a plate pivoted at one side of the cylinder extension and extending across the chamber thereof, and a gate pivotally attached to the plate and depending into the discharge aperture of the cylinder.

3. In a corn sheller, in combination, a shelling cylinder having an upward extension at its discharge end, means for moving material through the cylinder, a plate pivoted at one side of the cylinder extension and extending across the chamber thereof, a gate pivotally attached to the plate and depending into the discharge aperture of the cylinder, and means for adjustably limiting the downward movement of the plate.

4. In a corn sheller, in combination, a shelling cylinder having an upward extension at its discharge end, means for moving material through the cylinder, a plate pivoted at one side of the cylinder extension and extending across the chamber thereof, a gate pivotally attached to the plate and depending into the discharge aperture of the cylinder, means for adjustably limiting the downward movement of the plate, the plate being free to swing upwardly.

5. In a corn sheller, in combination, a shelling cylinder, a rotatable mandrel therein, a pivoted curved plate forming a part of the wall of the cylinder adjacent its discharge end, the line of the pivot of the plate being parallel with the cylinder and the free end of the plate projecting in the direction of rotation of the mandrel.

PLIN C. SOUTHWICK.

Witnesses:
D. M. Losee,
D. A. Hinman.

Copies of this patent may be obtained for five cents each, by addressing the "Commissioner of Patents, Washington, D. C."